April 9, 1940.                W. O. FREMONT                2,196,727
                              JOINT CONSTRUCTION
                              Filed Oct. 19, 1936
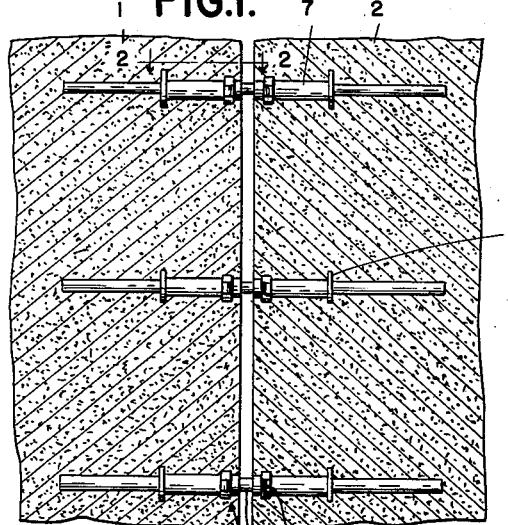
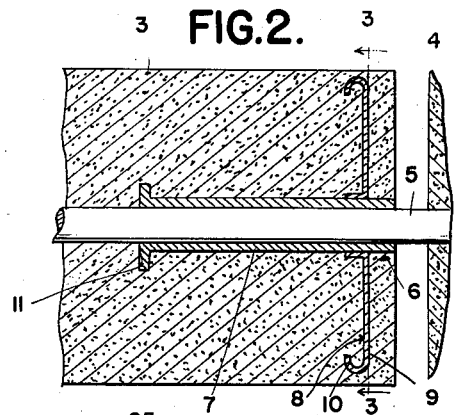
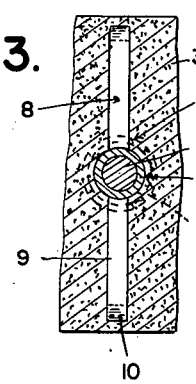
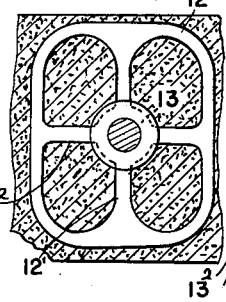
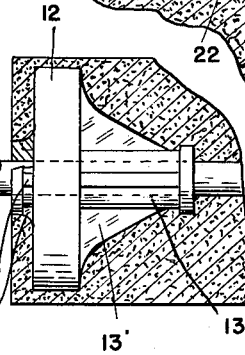
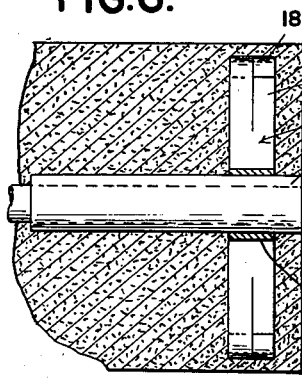
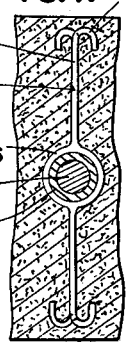
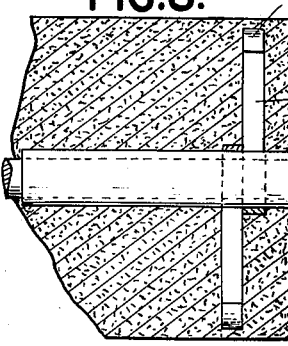
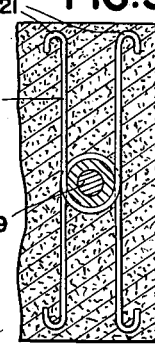
INVENTOR.
WYNNE OSCAR FREMONT
BY *Whittemore Hulbert & Belknap*
ATTORNEYS Patented Apr. 9, 1940

2,196,727

UNITED STATES PATENT OFFICE 2,196,727

JOINT CONSTRUCTION

Wynne Oscar Fremont, Ann Arbor, Mich.

Application October 19, 1936, Serial No. 106,481

5 Claims. (Cl. 94—18)

The invention relates to joints between load supporting members, such as blocks, slabs, beams and the like.

The invention has for some of its objects to provide a joint construction which will transfer a transverse load from one load supporting member to an adjacent load supporting member and avoid concentration or localization of stress; to provide a joint construction allowing for expansion and contraction; and to provide a joint construction which will avoid funneling out of the load supporting members. The invention has for another object to provide a joint construction employing a dowel between the load supporting members and embodying means for tying the dowel to the load supporting members principally in vertical directions.

With these and further objects in view, the invention resides in the novel features of construction and combinations and arrangements of parts as more fully hereinafter set forth.

In the drawing:

Figure 1 is a plan view of a portion of a structure, partly broken away, having a joint construction embodying my invention;

Figure 2 is a cross section on the line 2—2 of Figure 1;

Figure 3 is a cross section on the line 3—3 of Figure 2;

Figures 4 and 5 are views similar to Figures 2 and 3 respectively showing a modification;

Figures 6 and 7 are views similar to Figures 2 and 3 respectively showing a modification;

Figures 8 and 9 are views also similar to Figures 2 and 3 respectively showing a modification;

Figure 10 is a view similar to Figure 2 showing a modification.

As illustrated in the present instance, the joint construction embodying my invention is applied to a road pavement having the load supporting members 1 and 2 having the spaced end portions 3 and 4 respectively. The load supporting members are in the nature of concrete slabs horizontally spaced to provide for expansion and contraction of the joint. For transferring load from either of the load supporting members to the other, suitable members are provided forming the framework of the joint construction. These members may be of any suitable material and they may be spaced apart, as desired. Each of the load transferring members comprises a member extending across the space and into the end portions 3 and 4 of the load supporting members and anchors for tying the member to the end portions.

As shown particularly in Figures 2 and 3, each load transferring member comprises the dowel 5 which is located substantially midway between the tops and bottoms of the end portions 3 and 4 and the devices 6 for tying the dowel to each of the end portions 3 and 4. Each device 6 comprises the sleeve 7 upon and encircling the dowel and the anchor 8 upon the sleeve and having the portions 9 extending substantially perpendicular to the sleeve and the dowel and terminating in the return-bent portions 10. The portions 9, as shown, extend upwardly and downwardly and are located closely adjacent the end face of the end portion in which they are imbedded. The inner end of each sleeve is preferably formed with the flange 11 which also serves as an anchor for the sleeve.

With this construction it will be seen that while each dowel is slidable in its tying devices to provide for expansion and contraction of the joint construction, the tying devices effectively secure the dowel from transverse movement relative to the end portions of the load supporting members. Furthermore, it will be seen that the tying devices tie the dowel principally in vertical directions. In addition, by reason of locating anchors as near the end faces of the load supporting members as possible, funneling out of the end portions of these load supporting members is more effectively avoided.

In the modification shown in Figures 4 and 5, each of the devices for tying the dowel to one of the end portions of a load supporting member has the anchor 12 formed integral with the sleeve 13. While the tying device may be constructed in different ways as by having anchor arms or portions free of each other, or unconnected at their outer ends and reinforcing webs of various lengths and heights, the tying device, as shown, has its anchor 12 formed with the upwardly and downwardly extending arms 12' and the laterally extending arms 12², the outer ends of which are connected by rim portions. 13' and 13² are reinforcing webs between the anchor and sleeve in the planes of the arms. The tying device is preferably a casting.

Figures 6 and 7 disclose another modification in which the sleeve 14 and also the dowel is tied in place by means of the anchor 15, which has the portion 16 encircling the sleeve 14 at its outer end and the upwardly and downwardly extending portions 17 which terminate in the oppositely extending return-bent portions 18. These return-bent portions are formed by slitting the portions 17 and subsequently bending the parts formed by the slits.

In the modification shown in Figures 8 and 9, each dowel 19 is tied to the end portions of the load supporting members by means of the U-shaped anchors 20 which, as shown, embrace the dowel and extend upwardly and downwardly therefrom and terminate in the oppositely extending return-bent portions 21. These U-shaped anchors have the bases of their U's located side by side and these bases firmly engage the dowel. The anchors for tying the dowel to both end portions of the load supporting members may have a sliding fit with the dowel or the anchors in one of the end portions may be fixedly secured to the dowel and the anchors in the other of the end portions may slidably engage the dowel, the construction being such that in either instance expansion and contraction of the joint construction is provided for.

Figure 10 discloses another modification in which the dowel 22 is tied directly in one of the end portions by the anchor 23 fixedly secured to the dowel and tied indirectly in the other of the end portions by the anchor 24 fixed upon the sleeve 25, which encircles and slidably engages the dowel. This arrangement also provides for expansion and contraction of the joint construction.

From the above description, it will be noted that all the joint constructions will transfer a load from one supporting member to another load supporting member and avoid concentration of stress. Also the joint constructions provide for expansion and contraction and furthermore avoid funneling out of the end portions of the load supporting members.

What I claim as my invention is:

1. In a joint construction, the combination of spaced load supporting members and means for transferring load from one of the members to the other, comprising a dowel extending across the space between and into said members, sleeves slidably engaging said dowel, a plurality of angularly spaced spokes integral with and extending from each sleeve in directions substantially perpendicular to the dowel and adjacent the space bordering faces of said members, and rim portions integral with and at the outer ends of said spokes.

2. In a joint construction, the combination of spaced load supporting members and means for transferring load from one of the members to the other, comprising a dowel extending across the space between and into said members, and means for transversely anchoring said dowel to said member comprising a one-piece wheel having a rim, spokes and a hub embedded in said member, said hub being slidably mounted on said dowel.

3. In a joint construction, the combination of spaced load supporting members and means for transferring load from one of the members to the other, comprising a dowel extending across the space between and into said members, sleeves mounted upon said dowel, one of said sleeves being free to move axially relative to the dowel, spokes integral with said sleeves and extending perpendicular to the dowel adjacent the space bordering faces of said members, and rim portions surrounding said dowel and connected to the radially outer ends of said spokes.

4. In a joint construction, the combination of spaced load supporting slabs and means for transferring load from one of said slabs to the other, comprising a dowel extending across the space between and into said slabs, sleeves slidably engaging said dowel, and generally vertically extending anchors engaging said sleeves adjacent the space bordering faces of said slabs, said anchors comprising flat strips extending above and below said sleeves and terminating adjacent the upper and lower surfaces respectively of said slabs.

5. In a joint construction, the combination of spaced load supporting slabs, and means for transferring load from one of said slabs to the other, comprising a dowel extending across the space between and into said slabs, sleeves slidably engaging said dowel, and generally flat strips engaging said sleeves and having their flat surfaces extending parallel to and adjacent the space bordering faces of said slabs, said strips extending above and below said sleeves in generally vertical directions and having their outer extremities terminating in bent end portions adjacent the upper and lower surfaces of said slabs.

WYNNE OSCAR FREMONT.